(12) United States Patent
Miyazawa

(10) Patent No.: US 8,189,113 B2
(45) Date of Patent: May 29, 2012

(54) IMAGE PROCESSING APPARATUS, VIDEO RECEPTION APPARATUS, AND IMAGE PROCESSING METHOD

(75) Inventor: Hirotoshi Miyazawa, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 641 days.

(21) Appl. No.: 12/397,724

(22) Filed: Mar. 4, 2009

(65) Prior Publication Data

US 2009/0167956 A1 Jul. 2, 2009

Related U.S. Application Data

(63) Continuation of application No. PCT/JP2008/061174, filed on Jun. 12, 2008.

(30) Foreign Application Priority Data

Jun. 26, 2007 (JP) .................................. 2007-167958

(51) Int. Cl.
*H04N 5/14* (2006.01)
(52) U.S. Cl. .......................... 348/672; 382/168; 358/522
(58) Field of Classification Search ........................ None
See application file for complete search history.

(56) References Cited

U.S. PATENT DOCUMENTS

| | | | | |
|---|---|---|---|---|
| 5,848,181 A * | 12/1998 | Ogata | ........................... | 382/169 |
| 6,347,153 B1 * | 2/2002 | Triplett et al. | ................. | 382/224 |
| 6,389,162 B2 * | 5/2002 | Maeda | ........................... | 382/172 |
| 6,587,593 B1 * | 7/2003 | Matsuoka et al. | ............. | 382/260 |
| 6,658,399 B1 * | 12/2003 | Acharya et al. | ................. | 706/52 |
| 6,753,910 B1 * | 6/2004 | Ogata et al. | .................... | 348/235 |
| 2001/0053248 A1 * | 12/2001 | Maeda | ........................... | 382/165 |
| 2003/0031366 A1 * | 2/2003 | Li et al. | ........................... | 382/206 |
| 2003/0179945 A1 * | 9/2003 | Akahori | ......................... | 382/260 |
| 2005/0058343 A1 * | 3/2005 | Nenonen et al. | ............... | 382/169 |
| 2005/0285977 A1 * | 12/2005 | Nako et al. | ...................... | 348/672 |
| 2006/0028541 A1 * | 2/2006 | Haraguchi | ....................... | 348/27 |
| 2006/0093232 A1 * | 5/2006 | Yang et al. | ...................... | 382/254 |
| 2006/0280366 A1 * | 12/2006 | Ahmed et al. | .................. | 382/176 |
| 2007/0081721 A1 * | 4/2007 | Xiao et al. | ...................... | 382/167 |
| 2007/0154107 A1 * | 7/2007 | Jang | .............................. | 382/266 |
| 2008/0031539 A1 * | 2/2008 | Daly | .............................. | 382/274 |
| 2008/0044095 A1 * | 2/2008 | Albiez | ............................ | 382/237 |
| 2008/0152227 A1 * | 6/2008 | Miyazawa | ...................... | 382/190 |
| 2009/0213271 A1 * | 8/2009 | Miyazawa | ...................... | 348/672 |

FOREIGN PATENT DOCUMENTS

JP 08-016776 1/1996
(Continued)

OTHER PUBLICATIONS

International Search Report dated Jul. 15, 2008 for PCT/JP2008/061174.

*Primary Examiner* — Jefferey Harold
*Assistant Examiner* — Sam Huang
(74) *Attorney, Agent, or Firm* — Pillsbury Winthrop Shaw Pittman, LLP

(57) ABSTRACT

According to one embodiment, a video display apparatus having a smoothing processing unit inputs luminance signals of pixels which form an image, acquires histogram data by counting the numbers of pixels for respective levels of the input luminance signals, sets a correction amount for a change amount of the levels of luminance signals based on the acquired histogram data, corrects the change amount of the levels of luminance signals near a pixel to be processed based on the correction amount, and corrects the level of the input luminance signal for the pixel to be processed using the corrected change amount of the levels of luminance signals.

5 Claims, 5 Drawing Sheets

FOREIGN PATENT DOCUMENTS

| | | |
|---|---|---|
| JP | 11-266358 | 9/1999 |
| JP | 2000-030053 | 1/2000 |
| JP | 2000-156797 | 6/2000 |
| JP | 2003-256830 | 9/2003 |
| JP | 2005-295488 | 10/2005 |
| JP | 2006-050358 | 2/2006 |
| JP | 2006-229488 | 8/2006 |
| JP | 2006-229488 A * | 8/2006 |

* cited by examiner

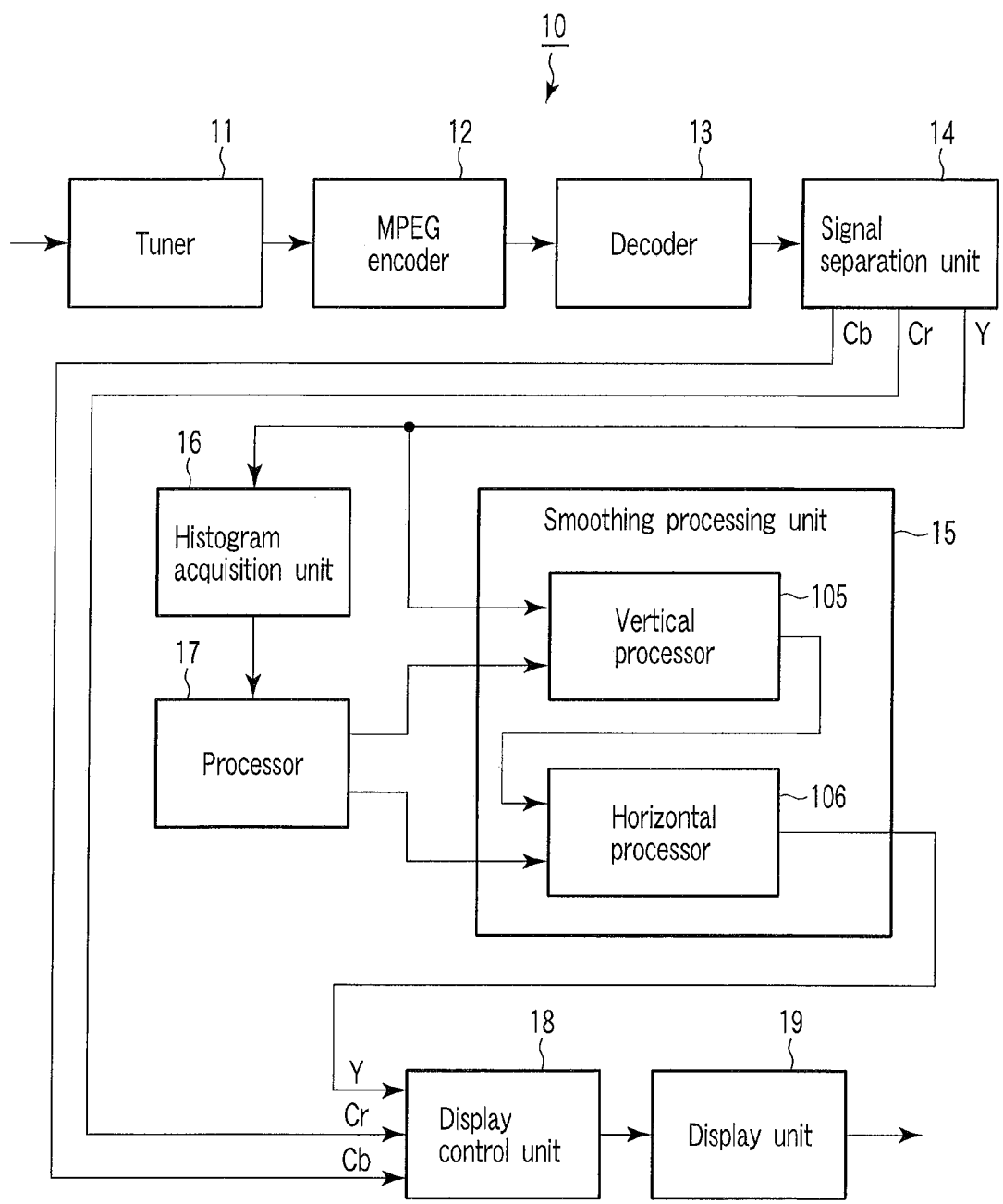
F I G. 1

IMAGE PROCESSING APPARATUS, VIDEO RECEPTION APPARATUS, AND IMAGE PROCESSING METHOD

CROSS REFERENCE TO RELATED APPLICATIONS

This is a Continuation Application of PCT Application No. PCT/JP2008/061174, filed Jun. 12, 2008, which was published under PCT Article 21(2) in English.

This application is based upon and claims the benefit of priority from Japanese Patent Application No. 2007-167958, filed Jun. 26, 2007, the entire contents of which are incorporated herein by reference.

BACKGROUND

1. Field

One embodiment of the present invention relates to an image processing apparatus and image processing method for processing an image, and a video reception apparatus including the image processing apparatus.

2. Description of the Related Art

Conventionally, in order to sharpen a video picture to be displayed on a display device, correction processing is often applied to a video signal. For example, as an image processing technique used to suppress granularity or the like of a display video picture, a smoothing technique is known.

For example, Japanese Patent Application Publication (KOKAI) No. H8-16776 discloses a technique for applying smoothing processing to a local region in an image. However, the technique described in the above reference cannot often apply effective processing. For example, a small tone step may exist in a plain region in an image. Such tone step (boundary) causes a Mach band. When different tones are continuously allocated in a domain, even if a tone difference is small, the boundary is recognized as a stripe pattern. The Mach band is readily generated in a digital video picture including discrete data. The technique described in the above reference cannot eliminate such phenomenon.

BRIEF DESCRIPTION OF THE SEVERAL VIEWS OF THE DRAWINGS

A general architecture that implements the various feature of the invention will now be described with reference to the drawings. The drawings and the associated descriptions are provided to illustrate embodiments of the invention and not to limit the scope of the invention.

FIG. 1 is an exemplary block diagram showing an example of the arrangement of a video display apparatus (image processing apparatus, video reception apparatus) according to an embodiment;

DETAILED DESCRIPTION

Figure 2:
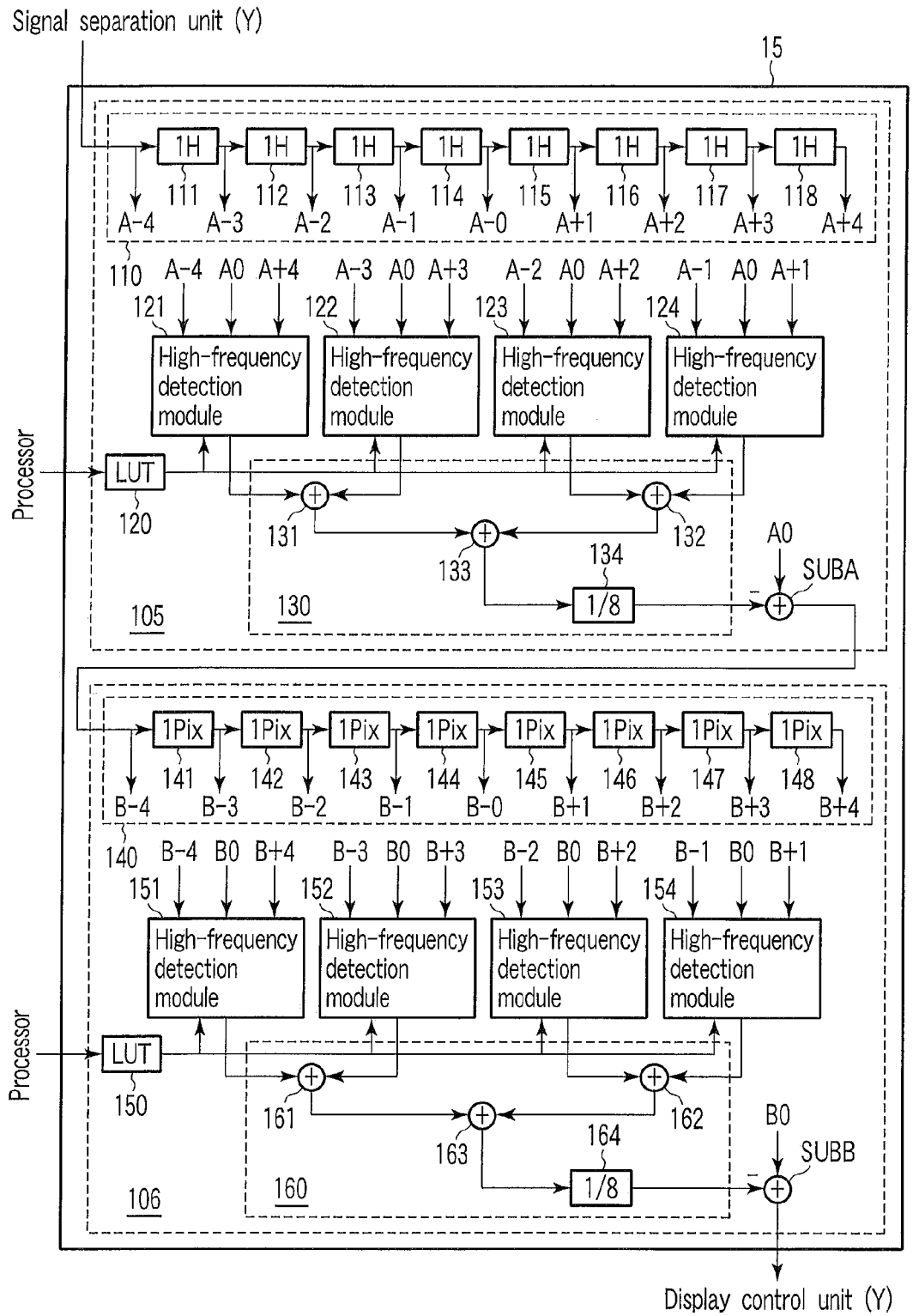
FIG. 2 is an exemplary circuit diagram showing an example of the arrangement of a smoothing circuit as a smoothing processing unit in the embodiment.

Various embodiments according to the invention will be described hereinafter with reference to the accompanying drawings. In general, according to one embodiment of the invention, a video display apparatus having an image processing apparatus inputs luminance signals of pixels which form an image, acquires histogram data by counting the numbers of pixels for respective levels of the input luminance signals, sets a correction amount for a change amount of the levels of luminance signals based on the acquired histogram data, corrects the change amount of the levels of luminance signals near a pixel to be processed based on the correction amount, and corrects the level of the input luminance signal for the pixel to be processed using the corrected change amount of the levels of luminance signals.

Embodiments of this invention will be described in detail with reference to the drawings.

FIG. 1 is a block diagram showing an example of the arrangement of a video display apparatus (image processing apparatus, video reception apparatus) according to an embodiment of the invention. As shown in FIG. 1, a video display apparatus 10 comprises a tuner 11, MPEG encoder 12, decoder 13, signal separation unit 14, smoothing processing unit 15, histogram acquisition unit 16, processor 17, display control unit 18, display unit 19, and the like.

The tuner 11 receives a broadcast signal, selects a specific broadcast channel, and outputs that broadcast signal. The encoder 12 encodes the broadcast signal output from the tuner 11 to obtain compression encoded data such as MPEG (Moving Picture Experts Group) 2 or the like. The decoder 13 decodes the compression encoded data output from the encoder 12 to obtain a signal (video signal) in a format displayable on the display unit 19. In the video display apparatus 10 of this embodiment, the tuner 11, MPEG encoder 12, and decoder 13 serve as a reception unit.

The signal separation unit 14 separates each frame image included in the video signal into luminance signals Y and chrominance signals Cr and Cb of pixels that form the frame image. In the video display apparatus 10 of this embodiment, the signal separation unit 14 serves as a separation unit. The luminance signal Y is a pixel signal which represents the luminance of the image, and the chrominance signals Cr and Cb are respectively a B-Y color difference signal and R-Y color difference signal, i.e., pixel signals which represent the color differences of the image. The luminance signal Y and chrominance signals Cr and Cb respectively include signals indicating the luminance and color for each pixel. Each pixel signal is a signal for controlling a pixel as a unit of display on the display unit 19.

The smoothing processing unit 15 applies smoothing processing to the video signal, and includes a vertical processor 105 and horizontal processor 106. In the video display apparatus 10 of this embodiment, the smoothing processing unit 15 serves as first and second correction units, and reduces a tone step in a plain region in which a luminance change in an image is small.

The vertical processor 105 processes the luminance signals Y output from the signal separation unit 14 to reduce a tone step in the image vertical direction. The horizontal processor 106 processes the luminance signals Y processed by the vertical processor 105 to reduce a tone step in the image horizontal direction. As will be described later, the chrominance signals Cr and Cb may be processed in addition to the luminance signals Y. In this case, the luminance signals Y are processed in the order of the vertical direction and horizontal direction. This processing can be executed by reversing the order or parallelly. Note that details of the vertical processor 105 and horizontal processor 106 will be described later.

The histogram acquisition unit 16 generates histogram data by counting pixels that form the image for respective luminance levels. In the video display apparatus 10 of this embodiment, the histogram acquisition unit 16 serves as an acquisition unit for acquiring a histogram, and acquires histogram data indicating the luminance distribution in a certain image region based on the luminance signals of pixels separated by the signal separation unit 14.

The processor 17 implements various kinds of processing such as arithmetic processing and the like when a control component (not shown) executes programs stored in a memory (not shown). In the video display apparatus 10 of this embodiment, the processor 17 serves as a setting unit which determines a correction amount (to be described later), and executes various kinds of arithmetic processing based on the histogram data.

The display control unit 18 controls display on the display unit 19. The display unit 19 is a display component such as a CRT, liquid crystal display, or the like. The display unit 19 displays an image having the number Nh of horizontal pixels and the number Nv of vertical pixels. In the video display apparatus 10 of this embodiment, the display control unit 18 and display unit 19 serve as a display unit.

The smoothing processing unit 15 will be described below.

FIG. 2 is a circuit diagram showing an example of the arrangement of a smoothing circuit as the smoothing processing unit 15. As shown in FIG. 2, the smoothing processing unit 15 comprises the vertical processor 105 which executes smoothing processing in the vertical direction of image information, and the horizontal processor 106 which executes smoothing processing in the horizontal direction of the image information.

The vertical processor 105 will be described in detail first.

As shown in FIG. 2, the vertical processor 105 includes a frequency component separation unit 110, LUT 120, high-frequency detection modules 121 to 124, averaging unit 130, subtraction unit SUBA, and the like. The vertical processor 105 reduces a small step in the vertical direction in image information.

The frequency component separation unit 110 has delay elements 111 to 118. The delay elements 111 to 118 comprise, e.g., line memories. The delay elements 111 to 118 delay the luminance signals Y by one pixel in the vertical direction. In this case, by delaying by the number Nh of horizontal pixels in the horizontal direction, one pixel is delayed in the vertical direction.

Using the eight delay elements 111 to 118, a delay for ±4 pixels is generated in the vertical direction. As a result, four sets of frequency components $(A_{-i}, A_0, A_{+i})$ are extracted (i=1 to 4) with reference to a pixel signal $A_0$ to be processed. Note that five or more sets of frequency components may be used.

The set of frequency components $(A_{-i}, A_0, A_{+i})$ is a set of pixel signals whose frequency components change from a shorter wavelength (higher frequency) to a longer wavelength (lower frequency) in the order of suffix i. Pixel signals $A_0$ and $A_{\pm i}$ mean those at a pixel $P_0$ to be processed and pixels $P_{\pm i}$ shifted from the pixel $P_0$ by the number ±i of pixels in the vertical direction.

Note that since pixel signals in the luminance signals Y are input in turn to the frequency component separation unit 110, all the pixel signals become the pixel signal $A_0$ to be processed in turn.

The high-frequency detection modules 121 to 124 respectively receive four sets of frequency components $(A_{-4}, A_0, A_{+4})$, $(A_{-3}, A_0, A_{+3})$, $(A_{-2}, A_0, A_{+2})$, and $(A_{-1}, A_0, A_{+1})$. The high-frequency detection modules 121 to 124 detect small change components from these sets of frequency components. The high-frequency detection modules 121 to 124 output values obtained by correcting the detected small change components based on correction amounts stored in the reference value table (LUT) 120. In this embodiment, the high-frequency detection modules 121 to 124 (and 151 to 154) serve as a first correction unit. An example of the arrangement of the high-frequency detection module and the correction amounts stored in the reference value table 120 will be described in detail later.

The averaging unit 130 averages the values output from the high-frequency detection modules 121 to 124 and multiplies the average value by (½). Furthermore, the averaging unit 130 adds the luminance value of the pixel $P_0$ to the product. That is, letting E1 to E4 be the output values from the high-frequency detection modules 121 to 124, an output value F of the averaging unit 130 is given by:

$$F=((E1+E2+E3+E4)/4)/2 \qquad (1)$$

As given in equation (1), the averaging unit 130 calculates a value F by averaging small change amounts E1 to E4 for respective frequency components detected by the high-frequency detection modules 121 to 124, and then multiplying the average value by (½). The value F has a meaning as the small luminance step in the vertical direction with respect to the pixel $P_0$. The value F calculated by the averaging unit 130 is supplied to the subtraction unit SUBA. The reason why the average value is multiplied by (½) is to consider that the pixel signal $A_0$ includes luminance steps in both the vertical and horizontal directions.

The subtraction unit SUBA subtracts the value F output from the averaging unit 130 from the pixel signal $A_0$ as a source signal. In this embodiment, the subtraction unit SUBA (and SUBB) serves as a second correction unit. With this processing, the vertical processor 105 removes a small step component in the vertical direction from the pixel signal $A_0$. A value (B=F+A) obtained by removing a small step component in the vertical direction from a pixel signal A by the vertical processor 105 is supplied to the horizontal processor 106.

The horizontal processor 106 will be described below.

The horizontal processor 106 processes luminance signals B processed by the vertical processor 105. The horizontal processor 106 executes processing for reducing a small step in the horizontal direction with reference to a pixel signal $B_0$ to be processed as in the vertical direction. As shown in FIG. 2, the horizontal processor 106 has a frequency component separation unit 140, high-frequency detection modules 151 to 154, averaging unit 160, subtraction unit SUBB, and the like. These components are practically the same as the frequency component separation unit 110, high-frequency detection modules 121 to 124, averaging unit 130, and subtraction unit SUBA in the vertical processor 105. For this reason, a detailed description about the horizontal processor 106 will not be given.

The frequency component separation unit 140 has delay elements 141 to 148. The delay elements 141 to 148 delay luminance signals Y by one pixel in the horizontal direction. Using the delay elements 141 to 148, a delay for ±4 pixels is generated in the horizontal direction. As a result, four sets of frequency components ($B_{-i}$, $B_0$, $B_{+i}$) are extracted (i=1 to 4) with reference to a pixel signal $B_0$ to be processed.

The four sets of frequency components ($B_{-i}$, $B_0$, $B_{+i}$) are input to the high-frequency detection modules 151 to 154, which calculate values G1 to G4 as small luminance changes for respective frequency components in the horizontal direction. The averaging unit 160 calculates a value H as a small luminance step in the horizontal direction using these values G1 to G4 by:

$$H=((G1+G2+G3+G4)/4)/2 \quad (2)$$

The subtraction unit SUBB subtracts the value H from the pixel signal $B_0$. As a result, the subtraction unit SUBB removes a small step component H in the horizontal direction from the pixel signal $B_0$. As a result, the value output from the horizontal processor 106 is a value obtained by removing the small luminance steps in the vertical and horizontal directions from the pixel signal $A_0$.

That is, a sum K (=F+H) of the value F obtained by the vertical processor 105 and the value H obtained by the horizontal processor 106 has a meaning as a luminance step in both the vertical and horizontal directions. In other words, the value K is the average of small luminance changes E1 to E4 and G1 to G4 for respective frequency components in both the vertical and horizontal directions, as given by:

$$K=F+H=(E1+\ldots+E4+G1+\ldots+G4)/8 \quad (3)$$

As given in equation (3), (½) by which the average values of the outputs from the high-frequency detection modules 121 to 124 and 151 to 154 are multiplied in equations (1) and (2) considers that the pixel signal $A_0$ includes steps in the vertical and horizontal directions.

As described above, the smoothing processing unit 15 calculates the small step around the pixel $A_0$ by the aforementioned averaging processing. Typically, the luminance step is as follows. That is, luminance levels change between neighboring pixels, and those before and after these pixels are maintained nearly constant although pixels are different. That is, the luminance step appears within a range of the luminance spatial frequency from a high frequency to a low frequency to some extent. As a result, by averaging the small luminance changes for respective frequency components, an amount included in all of these components, i.e., the luminance step is calculated as the value E.

In this embodiment, the luminance step is extracted by averaging the small changes at the spatial frequencies within the range of ±4 pixels. This spatial frequency range may be broadened. For example, the average may be calculated for spatial frequencies within a range of ±5 pixels or more. Since the step can be extracted based on more frequency components, the extraction precision may be improved.

However, when the frequency component range is excessively broadened, the extraction precision may lower. This is because frequency components lower than those in which the luminance step appears are more unlikely to include the luminance step to be extracted. For example, when the luminance step appears at every 50 pixels on the screen, the spatial frequency components within the range of ±25 pixels or more may not include any information of this step.

In the configuration example shown in FIG. 2, the averaging unit 130 (160) averages the small change amounts E1 to E4 (G1 to G4) without weighting them. Alternatively, the value F (H) may be calculated by averaging the small change amounts E1 to E4 (G1 to G4) after they are weighted, as given by:

$$F=(m1*E1+m2*E2+m3*E3+m4*E4)/((m1+m2+m3+m4)*2) \quad (5)$$

where m1 to m4 are weights.

These weights m1 to m4 are preferably set to be larger at the higher frequency side, and to be smaller at the lower frequency side. As described above, lower frequency components may include a small step.

An example of the arrangement of the high-frequency detection modules 121 to 124 (and 151 to 154) will be described in detail below.

Figure 3:
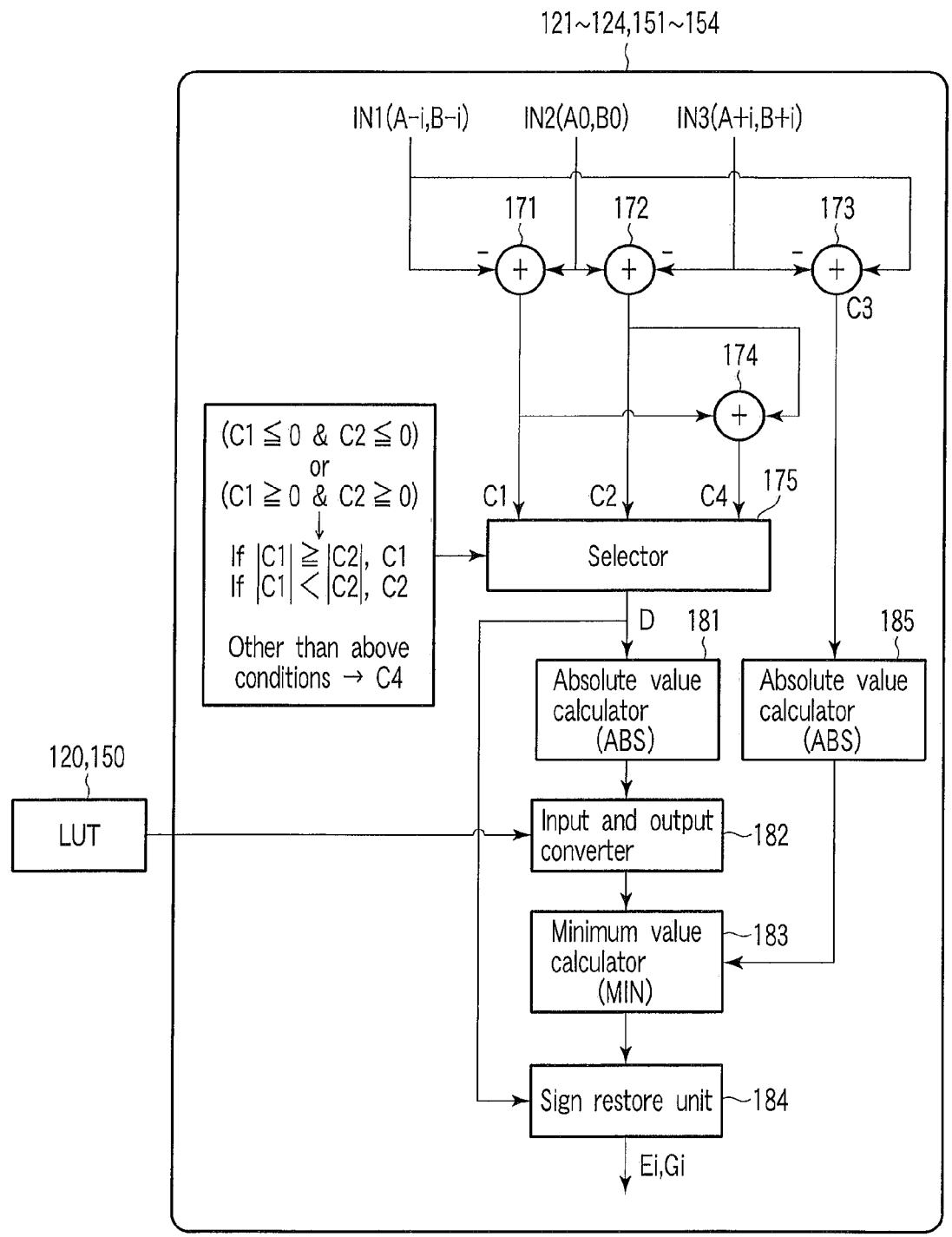
FIG. 3 is an exemplary block diagram showing an example of the internal arrangement of a high-frequency detection module according to the embodiment.

FIG. 3 is a block diagram showing an example of the internal arrangement of the high-frequency detection modules 121 to 124 (and 151 to 154).

Each of the high-frequency detection modules 121 to 124 (and 151 to 154) comprises subtractors 171 to 173, an adder 174, selector 175, absolute value calculators (ABS) 181 and 185, input and output converter 182, minimum value calculator (MIN) 183, and sign restore unit 184. The following description will be given while assuming the high-frequency detection modules 121 to 124 that receive (IN1($A_{-i}$), IN2 ($A_0$), IN3($A_{+i}$)), but the same processing applies to the high-frequency detection modules 151 to 154.

The subtractors 171, 172, and 173 respectively calculate values C1, C2, and C3 as differences between pixel signals $A_{-i}$, $A_0$, and $A_{+i}$ by:

$$C1=A_0-A_{-i} \quad (6)$$

$$C2=A_0-A_{+i} \quad (7)$$

$$C3=A_{-i}-A_{+i} \quad (8)$$

The adder 174 calculates a value C4 by:

$$C2+C1=(A_0-A_{+i})+(A_0-A_{-i})=2A_0+A_{-i}-A_{+i}=C4 \quad (9)$$

The values C1 and C2 mean the luminance change amounts from the pixel $P_0$, and the value C3 means an upward- or downward-sloping change around the pixel $P_0$.

The selector 175 outputs one having a larger absolute value of the values C1 and C2 as a value D.

The value C3 and the value D output from the selector 175 mean the luminance change amount around the pixel $P_0$. This change amount may represent a luminance step. As will be described later, when the averaging unit 130 averages the outputs from the high-frequency detection modules 121 to 124, the average value has a meaning as a luminance step.

The absolute value calculators 181 and 185 calculate the absolute values of the values D and C3. This is to eliminate the signs of the values D and C3 to facilitate the processing of the input and output converter 182.

The input and output converter 182 extracts a small amount obtained by correcting the value D based on a correction value stored in the reference value table 120. The correction amounts stored (set) in the reference value tables 120 and 150 are set based on the tendency such as the distribution of luminance levels in an image including the pixel of interest and the like. The processor 17 executes processing for setting data (respective reference values to be described later) indicating correction amounts based on the histogram data acquired by the histogram acquisition unit 16. Note that the processing for setting the correction amounts in the reference value tables 120 and 150 will be described in detail later.

The minimum value calculator 183 outputs a smaller one of the absolute value of the value D extracted (corrected) by the input and output converter 182, and that of the value C3. This is to take measures against generation of noise in an image by further reducing the value to be corrected.

Note that the selector 175 can integrate the functions of the minimum value calculator 183 and absolute value calculator 185. This is because the minimum value calculator 183 selects a value from the values D and C3 which have undergone the same processes (absolute value calculation and small amount extraction).

When the selector 175 integrates the function of the minimum value calculator 183, it receives the values C1 to C3, and selects the value D based on the following conditions (1) and (2) (the minimum value calculator 183 and absolute value calculator 185 are omitted).

(1) When the absolute value of the value C3 is larger than the absolute values of the values C1 and C2 ($|C3|>|C1|, |C2|$)

In this case, the strengths of pixel signals exhibit an upward- or downward-sloping change around the pixel $P_0$ corresponding to the pixel signal $A_0$ (on the increase or decrease). In this case, one having a larger absolute value of the values C1 and C2 is selected. That is, the value having a larger change amount with reference to the pixel signal $A_0$ is selected. The value having the larger absolute value may represent the actual condition of the luminance step.

(2) When the absolute value of the value C3 is smaller than the absolute value of at least one of the values C1 and C2 ($|C3|<\max(|C1|, |C2|)$)

In this case, the strengths of pixel signals exhibit a change with a top or bottom peak having the pixel $P_0$ as the center around the pixel $P_0$ corresponding to the pixel signal $A_0$ (neither on the increase nor decrease). In this case, the value C3 is selected as the value D. That is, the difference between the pixel signals $A_{\pm i}$ of the pixels $P_{\pm i}$ at the two ends of the pixel $P_0$ is selected. The pixel signal (luminance value) $A_0$ itself at the pixel $P_0$ is ignored since it does not contribute to the luminance step in the image.

The sign restore unit 184 restores the sign eliminated when the absolute value calculators 181 and 185 acquire the absolute values. As a result, the sign restore unit 184 (high-frequency detection modules 121 to 124) outputs a value E (E1 to E4).

The correction amounts set (stored) in the reference value tables 120 and 150 will be described below.

Figure 4:
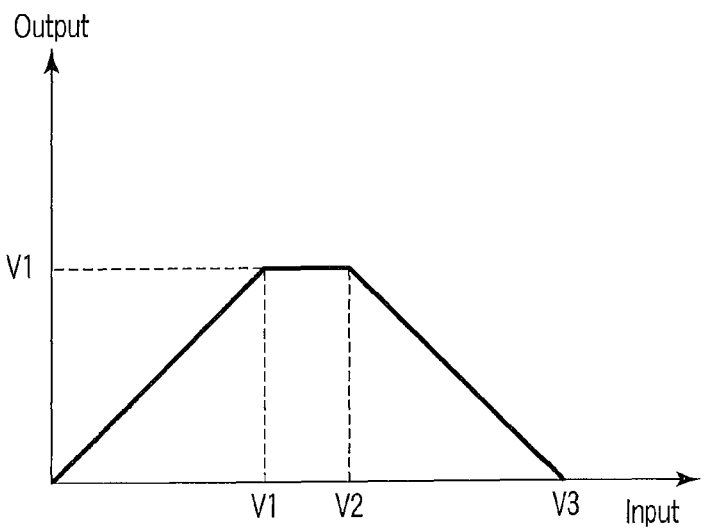
FIG. 4 is an exemplary graph showing an example of the setting of correction amounts (reference values indicating the correction amounts) stored in a reference value table in the embodiment.

FIG. 4 shows a setting example of the correction values (reference values indicating the correction values) stored in the reference value table 120. FIG. 4 shows the relationship between an input value Vi and output value Vo as the correction values in the input and output converter 182. In the example shown in FIG. 4, the input value Vi and output value Vo are equal to each other up to a reference value V1 (the input value Vi is output intact). In this case, the high-frequency detection modules 121 to 124 and 151 to 154 extract values up to the reference value V1 as steps. When the input value Vi exceeds the reference value V1, the output value Vo is fixed to the reference value V1 (to round the output). That is, a value larger than the reference value V1 tends not to be extracted as a small amount. When the input value Vi exceeds a reference value V2 (return value), the output value Vo decreases, and converges to zero at a reference value V3.

More specifically, when the reference values shown in FIG. 4 are set, correction of the input value Vi can be divided as follows depending on the reference values V1 to V3.

(1) Extraction Region (Equal to or Larger than 0 and Less than V1)

In this region, the input value Vi is output intact. That is, if the input value Vi is less than the reference value V1, the input value Vi is output without being corrected. As a result, the input value Vi less than the reference value V1 is extracted as a small value without correction.

(2) Non-extraction Region (Equal to or Larger than V3)

In this region, the input value Vi is not output. That is, if the input value Vi is equal to or larger than the reference value V3, the input value Vi is corrected to be zero. As a result, the input value Vi equal to or larger than the reference value V3 is not extracted as a small amount.

(3) Boundary Region (Equal to or Larger than V1 and Less than V3)

This region is the boundary region between the extraction region and non-extraction region, and the input value Vi is output after it is reduced. In other words, this region is a kind of buffer region. When the extraction region and non-extraction region are directly connected, noise may be generated in the image.

This boundary region is further divided into two regions.

(a) Constant Region (Equal to or Larger than V1 and Less than V2)

In this region, the output value Vo becomes constant (V1) irrespective of the input value Vi. That is, if the input value Vi is equal to or larger than the reference value V1 and is less than V2, the input value Vi is corrected to a constant value V1. As a result, the input value Vi equal to or larger than the reference value V1 and less than V2 is extracted as a small amount having the value V1.

(b) Decreasing Region (Equal to or Larger than V2 and Less than V3)

In this region, the output value Vo decreases with increasing input value Vi. That is, if the input value Vi is equal to or larger than the reference value V2 and less than the reference value V3, the input value Vi is corrected to decrease at a given ratio (the input value Vi is corrected to a value ranging from V1 to zero). As a result, the input value Vi equal to or larger than the reference value V2 and less than V3 is extracted as a small amount corrected to the value ranging from V1 to zero.

The reason why the boundary region is divided as described above is to smoothly connect the extraction region and non-extraction region and to prevent generation of unwanted noise in the image. In this case, the boundary region is divided by a combination of two straight lines (linear functions). Alternatively, the boundary region may be divided by a combination of three or more straight lines. The relationship between the input value Vi and output value Vo in the boundary region may be expressed by a curve (multidegree functions or the like). Furthermore, for both the extraction region and the boundary region, the relationship between the input value Vi and output value Vo in the boundary region may be expressed by a curve (multidegree functions or the like). In this case, the boundary between these region becomes unclear.

In the following description, assume that the correction amounts set by the reference values V1, V2, and V3 are set in the reference value tables 120 and 150, as shown in FIG. 4. For example, when the maximum value of the value D is "$2^{10}-1$" (10 bits), the reference values V1, V2, and V3 can adopt, for example, 4, 5, and 9. In this example, ratios R1, R2, and R3 of the reference values V1, V2, and V3 to the maximum value of the value D (V1/Dmax, V2/Dmax, and V3/Dmax) is $3.9 \times 10^{-3}$, $4.9 \times 10^{-3}$, and $8.8 \times 10^{-3}$. With the purpose of extracting a small change amount of luminance levels, it is preferable that this ratio R1 is sufficiently smaller than 1. The ratios R1, R2, and R3 are set to be about 1/100 or 1/50. If the ratios R1, R2, and R3 are small to some extent, the reference values V1, V2, and V3 can be appropriately determined as needed. For example, when the maximum value of the value D is "$2^{10}-1$", the reference value V1 is set to be 7, and the reference values V2 and V3 are set to be 7 and 16 accordingly. When the reference value V3 is 31 or less at a maximum, an effect can be obtained.

The correction amount setting processing in the reference value tables (LUT) 120 and 150 will be described below.

The processor 17 sets, in the reference value tables 120 and 150, correction amounts for the change components detected by the high-frequency detection modules 121 to 124 and 151 to 154. The processor 17 determines the tendency of the image based on the histogram data acquired by the histogram acquisition unit 16, and sets the correction amounts according to the image tendency in the reference value tables 120 and 150. For example, the processor 17 detects a plain region where a luminance change is small, and sets a correction amount that enhances the smoothing effect on that plain region.

As shown in FIG. 1, the histogram acquisition unit 16 receives luminance signals of respective pixels from the signal separation unit 14. The histogram acquisition unit 16 acquires histogram data by measuring the numbers of pixels of respective luminance levels in respective regions of one frame image input as the luminance signals.

In this case, assume that the number of divisions the luminance levels is sufficiently fine with respect to the dynamic range of input luminance signals. For example, the number of divisions is set to be 256 of an 8-bit resolution. The histogram data acquired by the histogram acquisition unit 16 after pixel signals for one frame are acquired is input to a program which is executed by the processor 17. Based on this histogram data, the processor 17 (the program executed by the processor 17) determines reference values indicating correction values for small luminance change components, and sets them in the reference value tables 120 and 150.

Figure 5:
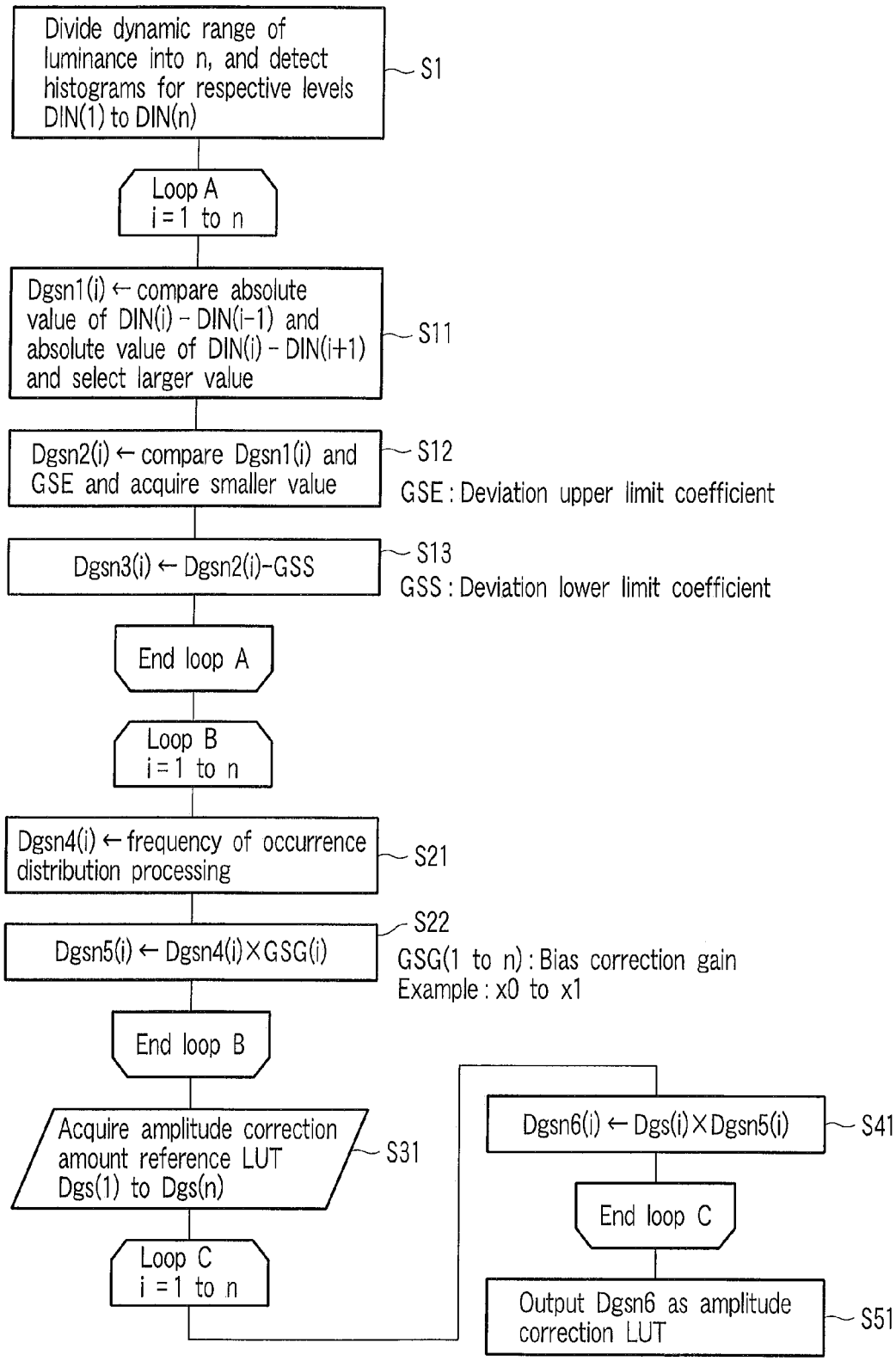
FIG. 5 is an exemplary flowchart for explaining an example of correction amount setting processing for small change components of luminance levels according to the embodiment.

FIG. 5 is a flowchart for explaining an example of the correction value setting processing for small change components of luminance levels.

Upon input of luminance signals, the histogram acquisition unit 16 divides the dynamic range of the luminance levels of the luminance signals into n, and counts the numbers of pixels for luminance levels 1 to n. In this manner, the histogram acquisition unit 16 acquires histogram data DIN(1) to DIN(n) for luminance levels 1 to n with respect to the luminance signals of pixels which form one frame image (step S1).

That is, the histogram data acquisition processing by the histogram acquisition unit 16 is implemented by dividing the dynamic range of luminance levels into n, and counting the numbers of pixels corresponding to luminance levels 1 to n with respect to the luminance signals of pixels which form one frame image. In this case, assume that the resolution of luminance levels 1 to n is set to be sufficiently fine.

For example, when an input video signal is defined by 8 bits, the resolution of luminance levels upon acquisition of histogram data is also 8 bits. In this case, the resolution of luminance levels is 8 bits (0 to 255), and the numbers of pixels corresponding to 256 luminance levels from "0 to 255" are acquired as histogram data. For this reason, by adding all the number of pixels of all the luminance levels in the histogram data, the total equals the number of pixels per frame of the input luminance signals.

In the following description, the resolution of luminance levels of respective pixels will be generalized as 1 to n in place of 0 to 255.

The processor 17 executes frequency of occurrence distribution processing to the histogram data DIN(1) to DIN(n) acquired by the histogram acquisition unit 16 (steps S11 to S13).

That is, the processor 17 calculates absolute values of differences between levels (i−1, i+1) before and after luminance level i to be calculated, and acquires a larger one of these values as Dgsn1(i) (DIN(0) and DIN(n+1) for which two ends are not defined, are calculated to have a value "0"), so as to detect a plain region where a luminance level difference is small. That is, the processor 17 acquires a larger value of |DIN(i)−DIN(i−1)| and |DIN(i)−DIN(i+1)| as Dgsn1(i) (step S11).

Upon acquisition of Dgsn1(i), the processor 17 subtracts a deviation upper limit coefficient GSE from Dgsn1(1) to Dgsn1(n) of luminance levels 1 to n to acquire Dgsn2(i) (step S12). This serves as a limiter since the correction value becomes too large if the value is too large.

Upon acquisition of Dgsn2(i), the processor 17 subtracts a deviation lower limit coefficient GSS from Dgsn2(i) of luminance levels 1 to n to acquire Dgsn3(i) (step S13). This is to inhibit processing by setting a value "0" when an area is smaller than an area to be corrected.

After acquisition of Dgsn3(1) to Dgsn3(n) of luminance levels 1 to n, the processor 17 executes frequency of occurrence distribution processing (step S21). In this frequency of occurrence distribution processing, the processor 17 acquires Dgsn4(1) to Dgsn4(n) of luminance levels 1 to n. The frequency of occurrence distribution processing further broadens the region to be corrected obtained based on the histogram data. This is to suppress a variation since the high-frequency emphasis level varies even by a slight variation for an edge portion of the image upon precisely setting a region, and a visual problem is posed.

The first to fourth calculation examples of the frequency of occurrence distribution processing will be described below. As the frequency of occurrence distribution processing, any of the first to fourth calculation examples may be used, and they have larger variation suppression effects in the order of the first calculation example, second calculation example, third calculation example, and fourth calculation example. The frequency of occurrence distribution processing that has an effect smaller or larger than this range may be used.

FIRST CALCULATION EXAMPLE

From Dgsn3(i), Dgsn3(i−1), 0.875*Dgsn3(i−2), 0.75*Dgsn3(i−3), 0.625*Dgsn3(i−4), 0.5*Dgsn3(i−5), 0.375*Dgsn3(i−6), 0.25*Dgsn3(i−7), 0.125*Dgsn3(i−8), Dgsn3(i+1), 0.875*Dgsn3(i+2), 0.75*Dgsn3(i+3), 0.625*Dgsn3(i+4), 0.5*Dgsn3(i+5), 0.375*Dgsn3(i+6), 0.25*Dgsn3(i+7), and 0.125*Dgsn3(i+8), a maximum value is acquired as Dgsn4(i).

SECOND CALCULATION EXAMPLE

From Dgsn3(i), Dgsn3(i−1), Dgsn3(i−2), 0.875*Dgsn3(i−3), 0.75*Dgsn3(i−4), 0.625*Dgsn3(i−5), 0.5*Dgsn3(i−6), 0.375*Dgsn3(i−7), 0.25*Dgsn3(i−8), 0.125*Dgsn3(i−9), Dgsn3(i+1), Dgsn3(i+2), 0.875*Dgsn3(i+3), 0.75*Dgsn3(i+4), 0.625*Dgsn3(i+5), 0.5*Dgsn3(i+6), 0.375*Dgsn3(i+7), 0.25*Dgsn3(i+8), and 0.125*Dgsn3(i+9), a maximum value is acquired as Dgsn4(i).

THIRD CALCULATION EXAMPLE

From Dgsn3(i), Dgsn3(i−1), Dgsn3(i−2), Dgsn3(i−3), 0.875*Dgsn3(i−4), 0.75*Dgsn3(i−5), 0.625*Dgsn3(i−6), 0.5*Dgsn3(i−7), 0.375*Dgsn3(i−8), 0.25*Dgsn3(i−9), 0.125*Dgsn3(i−10), Dgsn3(i+1), Dgsn3(i+2), Dgsn3(i+3), 0.875*Dgsn3(i+4), 0.75*Dgsn3(i+5), 0.625*Dgsn3(i+6), 0.5*Dgsn3(i+7), 0.375*Dgsn3(i+8), 0.25*Dgsn3(i+9), and 0.125*Dgsn3(i+10), a maximum value is acquired as Dgsn4(i).

FOURTH CALCULATION EXAMPLE

From Dgsn3(i), Dgsn3(i−1), Dgsn3(i−2), Dgsn3(i−3), Dgsn3(i−4), 0.875*Dgsn3(i−5), 0.75*Dgsn3(i−6), 0.625*Dgsn3(i−7), 0.5*Dgsn3(i−8), 0.375*Dgsn3(i−9), 0.25*Dgsn3(i−10), 0.125*Dgsn3(i−11), Dgsn3(i+1), Dgsn3(i+2), Dgsn3(i+3), Dgsn3(i+4), 0.875*Dgsn3(i+5), 0.75*Dgsn3(i+6), 0.625*Dgsn3(i+7), 0.5*Dgsn3(i+8), 0.375*Dgsn3(i+9), 0.25*Dgsn3(i+10), and 0.125*Dgsn3(i+11), a maximum value is acquired as Dgsn4(i).

Upon acquisition of Dgsn4(i) by the aforementioned frequency of occurrence distribution processing, the processor 17 calculates products Dgsn5(i) obtained by multiplying the values Dgsn4(i) of respective luminance levels i by values GSG(i) (step S22).

That is, in step S22 the processor 17 calculates the products Dgsn5(i) by making a calculation given by:

$$Dgsn5(i)=Dgsn4(i)\times GSG(i)$$

The processes in steps S21 and S22 are respectively executed for luminance levels 1 to n. The processor 17 sets gains for determining final correction amounts. This provides data amounts for levels 1 to n. GSG(i) is a value between "0" and "1". For example, if GSG(i) assumes "1", the maximum effect is assured; if GSG(i) assumes "0", no effect is obtained. With these gains, by varying the effect amounts for dark and bright parts, the policy of the setting user can be reflected. Alternatively, the user may select the gains in several levels like strong, middle, weak, and OFF between "0" and "1" using an apparatus menu or the like.

Upon acquisition of Dgsn5(i), the processor 17 acquires values Dgs(1) to Dgs(n) serving as references of respective amplitude correction amounts from the histogram data DIN(1) to DIN(n) of luminance levels 1 to n (step S31). This sets gains as references when correction using the histogram values is skipped.

Upon acquisition of Dgs(1) to Dgs(n), the processor 17 adds Dgsn5(i) to Dgs(i) to acquire Dgsn6(i) (step S41). That is, in step S41 the processor 17 calculates Dgsn6(i) by making a calculation given by:

$$Dgsn6(i)=Dgsn5(i)+Dgs(i)$$

This Dgsn6(i) serves as a correction amount according to the analysis result of the image. That is, Dgsn6(i) obtained by reflecting each correction parameter Dgsn5(i) obtained from the histogram data to the reference value Dgs(i) serves as a correction value according to a change (luminance change) in luminance level of pixels in the image. Upon acquisition of such Dgsn6(i), the processor 17 stores (sets) Dgsn6(i) in the reference value tables 120 and 150 as correction amounts (step S51).

An example of histogram data to be processed by the aforementioned processing sequence will be described below.

Figure 6A:
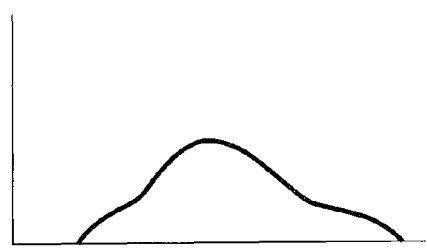
FIG. 6A is an exemplary graph showing an example of histogram data in the embodiment.
Figure 6B:
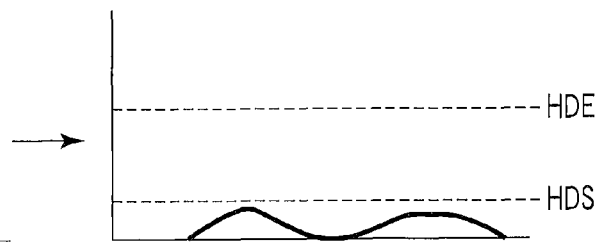
FIG. 6B is an exemplary graph showing Dgsn1(i) acquired from the histogram data shown in FIG. 6A in the embodiment.
Figure 7A:
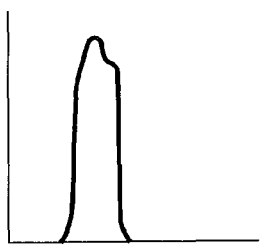
FIG. 7A is an exemplary graph showing an example of histogram data in the embodiment.
Figure 7B:
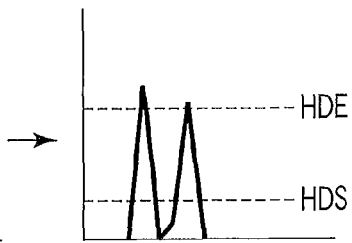
FIG. 7B is an exemplary graph showing Dgsn1(i) acquired from the histogram data shown in FIG. 7A in the embodiment.
Figure 7C:
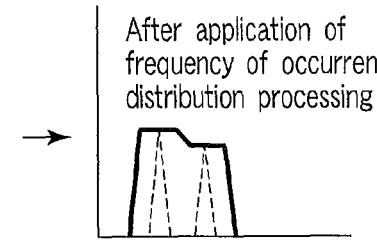
FIG. 7C is an exemplary graph showing Dgsn3(i) and Dgsn4(i) acquired from Dgsn1(i) shown in FIG. 7B in the embodiment.

FIGS. 6A and 7A show an example of histogram data. FIGS. 6B and 7B show Dgsn1(i) acquired from the histogram data shown in FIGS. 6A and 7A. FIG. 7C shows Dgsn3(i) and Dgsn4(i) acquired from Dgsn1(i) shown in FIG. 7B.

In histogram data DIN(1) to DIN(n) shown in FIG. 6A, pixels distribute over a broad range of luminance levels 1 to n.

For the histogram data DIN(1) to DIN(n) shown in FIG. 6A, differences Dgsn1(i) of absolute values with a slope, indicated by the solid curve in FIG. 6B, are acquired. In the example shown in FIG. 6B, Dgsn1(i) is always smaller than GSE. Hence, values Dgsn2(i) are indicated by the same curve as Dgsn1(i). Furthermore, since the values Dgsn2(i) are always smaller than GSS, values Dgsn3(i) always assume a value "0". For this reason, values Dgsn4(i) also always assume a value "0". As a result, the values Dgsn4(i) and Dgsn5(i) are always "0", and values Dgsn6(i) are equal to reference values Dgs(1) to Dgs(n).

By contrast, unlike the histogram data shown in FIG. 6A, in histogram data DIN(1) to DIN(n) shown in FIG. 7A, many pixels distribute near specific luminance levels of luminance levels 1 to n, and the pixel distribution has a bias (the pixel distribution is concentrated within a narrow range of luminance levels). For the histogram data DIN(1) to DIN(n) shown in FIG. 7A, differences Dgsn1(i) of absolute values with a slope, indicated by the solid curve in FIG. 7B, are acquired. The values Dgsn1(i) shown in FIG. 7B undergo the upper limit cutting using GSE and values Dgsn2(i) undergo lower limit cutting using GSS, thus acquiring Dgsn3(i) indicated by broken curves shown in FIG. 7C. For the values Dgsn3(i) indicated by the broken curves in FIG. 7C, values Dgsn4(i) indicated by a solid curve in FIG. 7C are acquired. This frequency of occurrence distribution processing is correction for broadening the range of a steep edge. Therefore, when the histogram data shown in FIG. 7A are obtained, values Dgsn6(i) assume values obtained by adding the Dgsn4(i) indicated by the solid curve in FIG. 7C to the reference values Dgs(1) to Dgs(n).

As described above, according to this embodiment, the reference values indicating correction amounts according to changes in luminance level in the image can be set in the reference value tables 120 and 150. Therefore, the smoothing processing unit 15 can correct the luminance levels of respective luminance signals based on the optimal correction amounts according to changes in luminance levels in the image. That is, correction amounts that can enhance the effect of smoothing processing (correction) in a plain image with a small luminance change can be set, and correction amounts that can suppress the effect of smoothing processing (correction) in an image with a large luminance change can be set.

In other words, even when the correction amounts that enhance the effect of correction are set for a plain image, those which can suppress the effect of correction can be set for a non-plain image. For this reason, small luminance change components (step components) in a plain image can be strongly reduced without blurring the entire image. For example, in a natural image including mountains and blue sky, a minute description of trees clearly describes a required mountain image part of mountains (a part with large luminance changes), and a blue sky part (a part with small luminance changes) can be smoothly described.

For example, upon visually observing an image with a small number of tones, small luminance steps may often be recognized. Especially, when small tone steps are allocated on a plain part such as blue sky or the like in an image, they are more likely to be visually recognized as a Mach band. Even for such image, in this embodiment, the vertical processor 105 and horizontal processor 106 can reduce small step components (to smooth tone steps) in both the vertical and horizontal directions from luminance signals of respective pixels using the correction amounts according to luminance changes in the image. As a result, a Mach band in the image can be eliminated.

Upon displaying a low-resolution image at a high resolution, the small step reduction processing of the vertical processor 105 and horizontal processor 106 is particularly effective. The display resolution on the display unit 19 may often be higher than the resolution of an original image. In such case, upon reducing small steps in an image, tones which are not used in the original image can be used. As a result, small steps (Mach band) can be reduced without destroying detail information in a high-frequency range. The reason why the resolution of the image itself does not match that of the display unit 19 includes, for example, use of multi-bit broadcast signals, compression of information for efficient transmission, and the like.

In the above embodiment, the image processing for luminance signals of pixels has been explained. Also, the same applies to chrominance signals of pixels.

In the above embodiment, the sequence for applying vertical processing to luminance signals of respective pixels and then horizontal processing has been explained. However, the invention is not limited to such specific sequence. For example, upon simultaneously executing the vertical processing and horizontal processing, nearly the same effects can be obtained. In this case, since delay circuits can be reduced, the circuit scale of the smoothing processing unit can be reduced.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
an input unit configured to input pixel signals of respective pixels which form an image;
an acquisition unit configured to acquire histogram data by counting the numbers of pixels for respective levels of the pixel signals input by the input unit;
a setting unit configured to set correction amounts for changes amounts of levels of the pixel signals based on the histogram data acquired by the acquisition unit;
a first correction unit configured to correct a change amount of levels of pixel signals near a pixel to be processed based on the correction amounts set by the setting unit; and
a second correction unit configured to correct the level of the pixel signal input by the input unit in association with the pixel to be processed using the change amount of the levels of the pixel signals corrected by the first correction unit,
wherein the correction amounts hold a change amount less than a first reference value, correct a change amount not less than the first reference value and less than a second reference value to the first reference value, and correct a change amount not less than the second reference value and less than a third reference value to a change amount not more than the first reference value, and
wherein the setting unit sets, as the correction amounts, data obtained by correcting the predetermined first and third reference values by values calculated based on the histogram data.

2. An apparatus according to claim 1, wherein the setting unit sets, as the correction amount, data obtained by applying frequency of occurrence distribution processing to the histogram data, and correcting predetermined reference values by values calculated based on the histogram data that have undergone the frequency of occurrence distribution processing.

3. An apparatus according to claim 1, further comprising a display unit configured to display an image based on pixel signals corrected by the second correction unit.

4. A video reception apparatus comprising:
a reception unit configured to receive a broadcast signal and to convert the received broadcast signal into a video signal;
a separation unit configured to separate desired pixel signals of pixels which form each frame image of the video signal converted by the reception unit;
an acquisition unit configured to acquire histogram data by counting the numbers of pixels for respective levels of the pixel signals obtained by the separation unit;
a setting unit configured to set correction amounts for changes amounts of levels of the pixel signals based on the histogram data acquired by the acquisition unit;
a first correction unit configured to correct a change amount of levels of pixel signals near a pixel to be processed based on the correction amounts set by the setting unit; and
a second correction unit configured to correct the level of the pixel signal obtained by the separation unit in association with the pixel to be processed using the change amount of the levels of the pixel signals corrected by the first correction unit,
wherein the correction amounts hold a change amount less than a first reference value, correct a change amount not less than the first reference value and less than a second reference value to the first reference value, and correct a change amount not less than the second reference value and less than a third reference value to a change amount not more than the first reference value, and
wherein the setting unit sets, as the correction amounts, data obtained by correcting the predetermined first and third reference values by values calculated based on the histogram data.

5. An image processing method used in an image processing apparatus, comprising:
inputting pixel signals of respective pixels which form an image;
acquiring histogram data by counting the numbers of pixels for respective levels of the input pixel signals;
setting correction amounts for changes amounts of levels of the pixel signals based on the acquired histogram data;
correcting a change amount of levels of pixel signals near a pixel to be processed based on the correction amounts; and
correcting the level of the input pixel signal in association with the pixel to be processed using the corrected change amount of the levels of the pixel signals,
wherein the correction amounts hold a change amount less than a first reference value, correct a change amount not less than the first reference value and less than a second reference value to the first reference value, and correct a change amount not less than the second reference value and less than a third reference value to a change amount not more than the first reference value, and
wherein the setting of correction amounts sets data obtained by correcting the predetermined first and third reference values by values calculated based on the histogram data.

\* \* \* \* \*